United States Patent Office 2,845,332
Patented July 29, 1958

2,845,332

PRODUCTION OF AMMONIUM SULFATE AND FERROUS CARBONATE FROM FERROUS SULFATE-CONTAINING SOLUTIONS

Carl F. Allison and George M. Dreher, Mount Lebanon Township, Allegheny County, and Charles A. Trathowen, McKeesport, Pa., assignors to Jones & Laughlin Steel Corporation, Pittsburgh, Pa., a corporation of Pennsylvania No Drawing. Application September 24, 1954
Serial No. 458,266

7 Claims. (Cl. 23—119)

This invention relates to a process for producing commercially acceptable ammonium sulfate from ferrous sulfate-containing aqueous solutions. It is more particularly concerned with the production of ammonium sulfate from waste pickle liquors which remain after ferrous articles have been pickled with dilute sulfuric acid.

In the manufacture of ferrous metal articles it is common practice to treat hot-rolled shapes with aqueous solutions of sulfuric acid in order to remove the hot-rolled scale from the surface of such shapes. The spent or waste pickle liquor remaining after such treatment contains free sulfuric acid in amounts frequently reaching 8 to 10% and iron in the form of ferrous sulfate in amounts which may exceed 20%. Generally speaking, it has not proved economic to recover either the acid or the iron contents of waste pickle liquor on any large scale, and consequently the great bulk of the millions of gallons of waste pickle liquor produced every year must be disposed of as waste.

It is an object, therefore, of this invention to provide a process for treating the ferrous sulfate content of waste pickle liquor so as to convert it into ammonium sulfate. It is another object of this invention to produce by this means iron-free ammonium sulfate. It is a further object to provide such a process which can produce ammonium sulfate especially valuable for fertilizer by reason of its potash content. Other objects will appear in the course of the description of our process.

The converison of the ferrous sulfate content of waste pickle liquor into ammonium sulfate by treatment of the waste pickle liquor with ammonia or some ammonium compound has attracted the attention of many investigators. No such process, however, has been commercially successful as far as we know in producing commercially acceptable ammonium sulfate. Commercially pure ammonium sulfate is very light in color and the lighter or nearer-white this color is, the more acceptable is the product to the trade. Iron compounds, even though present in small amounts, darken the color of the salt and so reduce its acceptability. Perhaps the principal problem of producing commercially acceptable ammonium sulfate from ferrous sulfate-containing starting materials is to bring about a complete removal of iron compounds from the crystallized salt; otherwise its color is so dark that it cannot be sold in competition with ammonium sulfate produced from coke oven gas.

The problem of utilizing the iron content of waste pickle liquor has likewise received considerable attention from many investigators. These have devised numerous processes for converting the iron from waste pickle liquor solutions into iron oxides suitable for pigments. Many of these have achieved a satisfactory yield of iron in this form, but, again, none of these, to the best of our knowledge, has succeeded in removing enough iron to permit the remaining solution to be converted into a light-colored ammonium sulfate.

We have found that iron sulfate-containing aqueous solutions obtained from waste pickle liquor can be reacted with ammonium compounds in such a manner as to precipitate all the contained iron in a form which can be separated from the resulting ammonium sulfate-containing solution by filtration or other means. The dried ammonium sulfate resulting from our process is as light in color as that produced from coke oven gas and is entirely acceptable commercially.

We prefer to use as a starting material a ferrous sulfate-containing aqueous solution obtained from the waste pickle liquor by removing most or all of the free acid therefrom. The removal of free acid from the waste pickle liquor may be accomplished by known means and does not in itself form a part of our invention. Our starting material may be obtained, for example, by evaporating from 20 to 25% of the water from waste pickle liquor. This evaporation brings about a precipitation of ferrous sulfate in the form of coppers and this solid precipitate can be filtered out and again put into aqueous solution. It is also possible to produce our starting material by lowering the temperature of the waste pickle liquor. The solubility of ferrous sulfate in water decreases with decreasing temperature and the salt at a sufficiently low temperature can be precipitated as a solid and removed by filtration. To the ferrous sulfate-containing aqueous solution obtained by either of the above mentioned means or by other means we add a sufficient amount of ammonium compound, to be described, to convert all the ferrous sulfate of the starting material into ferrous carbonate and ammonium sulfate. We prefer to use ammonium bicarbonate for this purpose but ammonium carbonate, ammonium carbamate and mixtures of any two or three of these compounds may also be used satisfactorily.

It is believed that the chemical reactions taking place are as follows:

For ammonium bicarbonate $$NH_4HCO_3 + FeSO_4 \rightarrow FeCO_3 + NH_4HSO_4$$

$$NH_4HSO_4 + NH_3 \rightarrow (NH_4)_2SO_4$$

For ammonium carbonate $$(NH_4)_2CO_3 + FeSO_4 \rightarrow FeCO_3 + (NH_4)_2SO_4$$

For ammonium carbamate $$NH_4CO_2NH_2 + FeSO_4 + H_2O \rightarrow FeCO_3 + (NH_4)_2SO_4$$

The ferrous sulfate-containing aqueous solution employed as our starting material will shown an acid reaction even though all the free acid originally contained in the waste pickle liquor has been removed. The ammonium compounds above mentioned are, of course, basic. Addition of such ammonium compounds to the ferrous sulfate-containing aqueous solution therefor raises the pH of the latter. The addition of sufficient ammonium compound to convert all the ferrous sulfate into ferrous carbonate and ammonium sulfate will approximately neutralize the solution and further additions of the ammonium compound, even in considerable amounts, will not raise the pH of the solution much above 7. Although iron carbonate precipitates under these conditions the precipitation is far from complete. We have found that in order to produce ammonium sulfate of the color desired it is necessary to raise the pH of the solution considerably above 7 and to drive off dissolved $CO_2$ therefrom. We therefore add to the solution a strong base which is most conveniently ammonium hydroxide, and we find that dissolved $CO_2$ is driven off most conveniently by boiling the solution for a time not less than about 3 minutes. When the ammonium compound added is ammonium bicarbonate and the strong base is ammonium hydroxide, we find that the latter must be added in an amount sufficient to bring the pH of the solution before boiling to a value of about 8. During boiling the pH of the solution increases to a value of about 9 and when this pH is reached after boiling, all the iron has precipitated in the form of iron carbonate which can be filtered out of the solution leaving only dissolved ammonium sulfate. The latter can be obtained as a dry salt by conventional means and displays a very light color which is entirely acceptable commercially.

When the ammonium compound added is ammonium carbonate, the pH of the solution after the addition of ammonium hydroxide decreases slightly during boiling but the results as above described will be obtained if the pH after boiling is not less than about 9. The pH of the solution before boiling should be not less than 9.2 and desirably about 9.4.

Mixtures of the ammonium compounds above mentioned also produces satisfactory results if the pH of the solution after boiling is not less than about 9. The pH of the solution after boiling may exceed the value of 9 by substantial amounts without impairing the quality of the ammonium sulfate, but at high pH values ammonia is driven off. Likewise, the time of boiling may extend considerably beyond 3 minutes without ill effect.

The bulk of the waste pickle liquor from which the starting material for our process may be obtained is produced at steel plants which usually include by-product coking ovens. We have found that the ammonium compound to be added may be conveniently produced at such by-product coke ovens by bubbling $CO_2$-containing gas through aqua ammonia. This process produces principally ammonium bicarbonate together with smaller amounts of ammonium carbonate and ammonium carbamate.

It is not necessary that the strong base used in our process to bring the pH of the solution to the desired value be ammonium hydroxide, although this compound is usually the most desirable since it does not introduce any foreign elements into the product. Potassium hydroxide may be used for this purpose, and the resulting ammonium sulfate then contains potash which is desirable if the product is to be used as fertilizer. Strong bases other than ammonium hydroxide tend to drive off ammonia, and when such bases are used our process should be carried out in a closed system.

We claim:

1. The process of producing iron-free ammonium sulfate from an aqueous solution of ferrous sulfate obtained from waste pickle liquor comprising adding to said solution a member of the group consisting of ammonium carbonate, ammonium bicarbonate, ammonium carbamate, and mixtures thereof whereby said ferrous sulfate is converted into ferrous carbonate and ammonium sulfate, then adding to said solution a strong base, then heating said solution to drive off dissolved $CO_2$ therefrom, the amount of strong base being adjusted to bring the pH of said solution after removal of dissolved $CO_2$ to a value not less than about 9, whereby all said ferrous carbonate is precipitated, and removing said precipitated ferrous carbonate.

2. The process of claim 1 in which the strong base is ammonium hydroxide.

3. The process of claim 1 in which the strong base is potassium hydroxide.

4. The process of producing iron-free ammonium sulfate from an aqueous solution of ferrous sulfate obtained from waste pickle liquor comprising adding to said solution a member of the group consisting of ammonium carbonate, ammonium bicarbonate, ammonium carbamate, and mixtures thereof whereby said ferrous sulfate is converted into ferrous carbonate and ammonium sulfate, then adding to said solution a strong base, then boiling said solution, the amount of strong base being adjusted to bring the pH of the solution after boiling to a value not less than about 9, whereby all said ferrous carbonate is precipitated, and removing said precipitated ferrous carbonate.

5. The process of producing iron-free ammonium sulfate from an aqueous solution of ferrous sulfate obtained from waste pickle liquor comprising adding to said solution ammonium carbonate whereby said ferrous sulfate is converted into ferrous carbonate and ammonium sulfate, then adding to said solution a strong base in quantity sufficient to raise the pH of said solution to a value of not less than about 9.2, then boiling said solution, whereby all said ferrous carbonate is precipitated, and removing said precipitated ferrous carbonate.

6. The process of producing iron-free ammonium sulfate from an aqueous solution of ferrous sulfate obtained from waste pickle liquor comprising adding to said solution ammonium bicarbonate whereby said ferrous sulfate is converted into ferrous carbonate and ammonium sulfate, then adding to said solution a strong base in quantity sufficient to raise the pH of said solution to a value of not less than about 8, then boiling said solution, whereby all said ferrous carbonate is precipitated, and removing said precipitated ferrous carbonate.

7. The process of claim 6 in which the strong base is ammonium hydroxide.

References Cited in the file of this patent

UNITED STATES PATENTS

| | | |
|---|---|---|
| 2,374,454 | Oliver | Apr. 24, 1945 |
| 2,529,874 | Hoak | Nov. 4, 1950 |
| 2,584,280 | Meissner | Feb. 5, 1952 |

FOREIGN PATENTS

| | | |
|---|---|---|
| 310,635 | Great Britain | May 2, 1929 |
| 607,231 | Great Britain | Dec. 12, 1946 |

UNITED STATES PATENT OFFICE
CERTIFICATE OF CORRECTION

July 29, 1958

Patent No. 2,845,332

Carl F. Allison et al.

It is hereby certified that error appears in the printed specification of the above numbered patent requiring correction and that the said Letters Patent should read as corrected below.

Column 1, line 43, for "converison" read --conversion--; column 2, line 17, for "coppers" read --copperas--.

Signed and sealed this 14th day of October 1958.

(SEAL)
Attest:

KARL H. AXLINE
Attesting Officer

ROBERT C. WATSON
Commissioner of Patent